June 30, 1942.  J. R. HOBSON  2,288,454
METHOD OF FORMING HOLLOW ARTICLES OF PLASTIC MATERIAL
Filed May 13, 1938  3 Sheets-Sheet 2
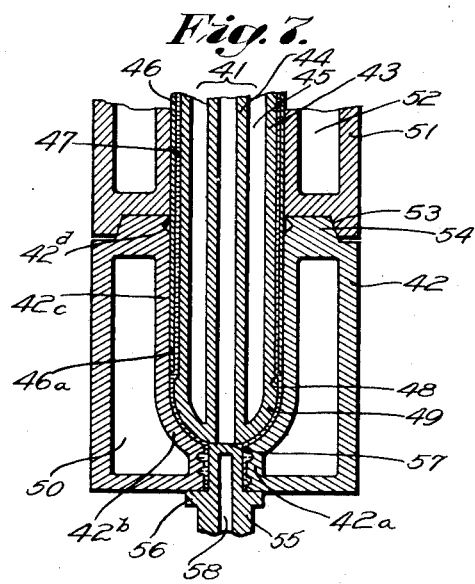
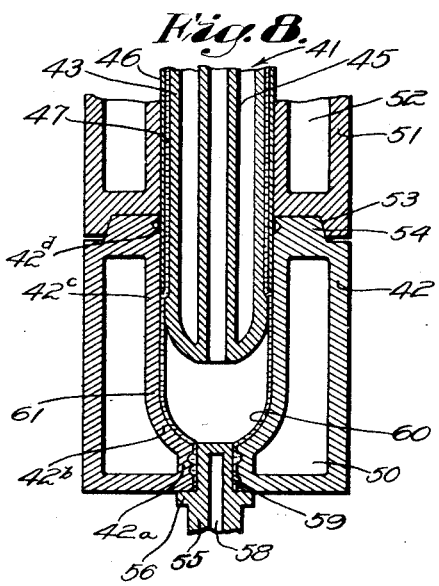
Inventor
John R. Hobson
by Brown & Parham
Attorneys
Witness
W. B. Thayer June 30, 1942.   J. R. HOBSON   2,288,454
METHOD OF FORMING HOLLOW ARTICLES OF PLASTIC MATERIAL
Filed May 13, 1938   3 Sheets-Sheet 3
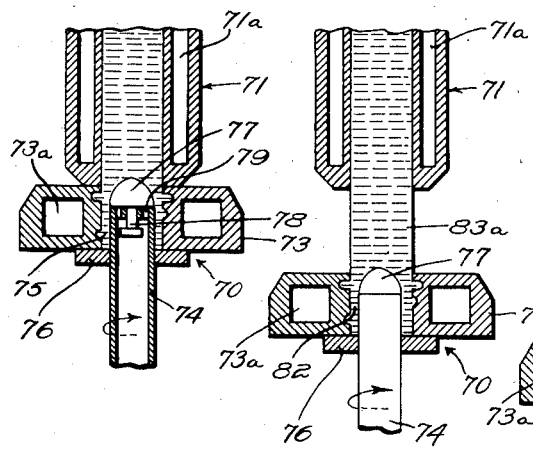
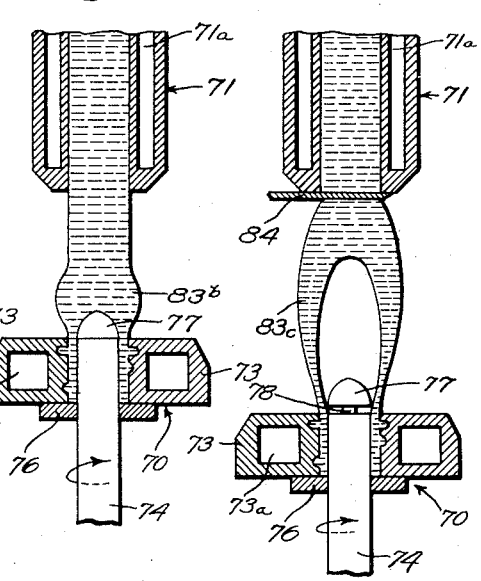
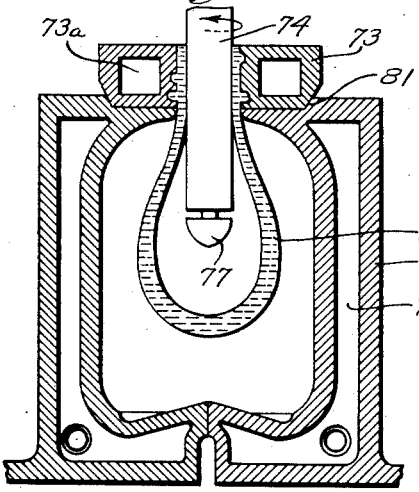
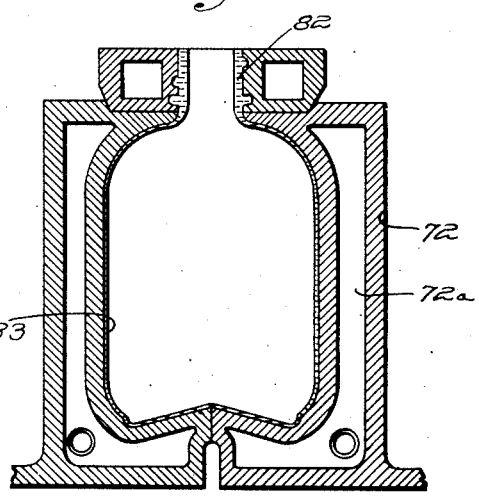
Inventor
John R. Hobson
by Brown & Parham
Attorneys
Witness
W. B. Thayer Patented June 30, 1942

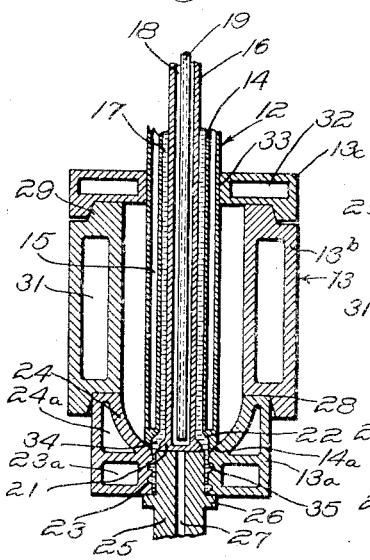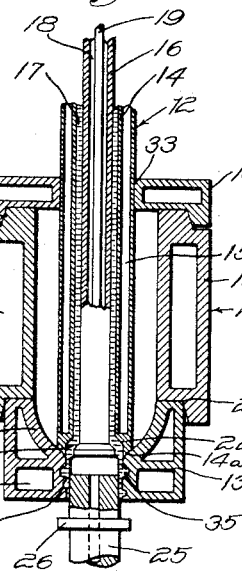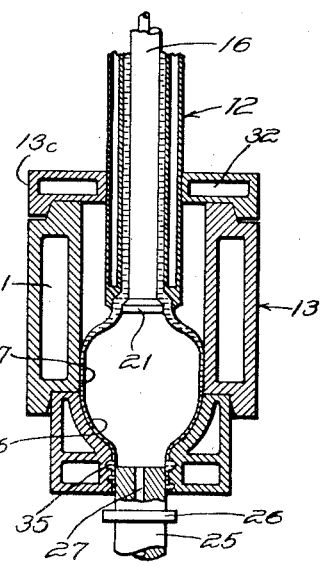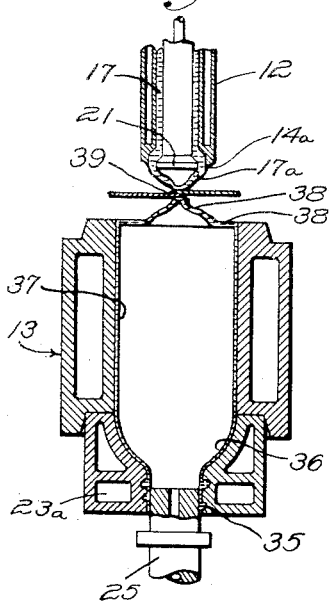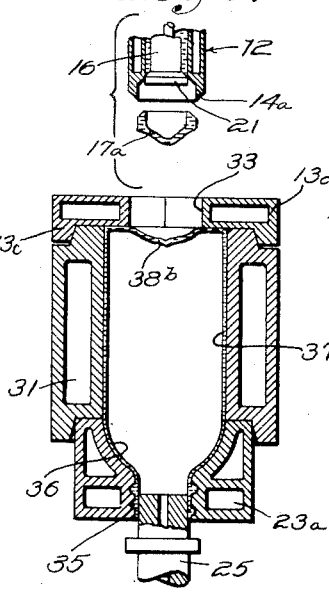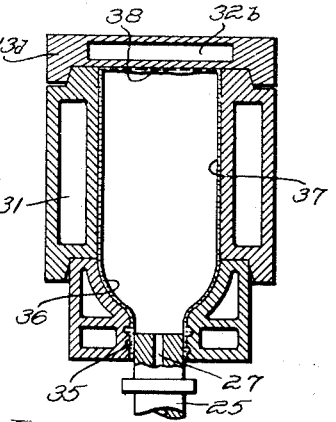

2,288,454

UNITED STATES PATENT OFFICE 2,288,454

METHOD OF FORMING HOLLOW ARTICLES OF PLASTIC MATERIAL

John R. Hobson, West Hartford, Conn., assignor, by mesne assignments, to Plax Corporation, Hartford, Conn., a corporation of Delaware Application May 13, 1938, Serial No. 207,698

11 Claims. (Cl. 18—55)

This invention relates to methods of forming hollow articles of organic plastic material. The invention is directed to the working of organic plastic materials, such as cellulose acetate and other organic thermoplastics, but is not limited in its use specifically thereto but may be employed in working other organic materials adapted to be rendered plastic by heat or heat and pressure and formed into hollow articles while in plastic condition.

The general object of the invention is to provide a novel method of forming such hollow articles of desired shapes and dimensions, in a simple, efficient and economical manner.

More specifically, it is an object of the invention to provide a novel method by the employment of which organic material in plastic condition may be formed into hollow articles such as containers with necks of exact shape and dimensions adapted to be fitted with the desired type of cap or closure such as a standard cap or closure now used on other kinds of containers. In conjunction with this object, it is a further object of the invention to form the body portion of hollow objects in such a manner as to permit control of the shape, size and distribution of material in, such portion of the articles.

The invention is of particular utility in, though not limited to, the manufacture of hollow articles having narrow necks, that is, in which the necks of the articles are narrower in diameter than the diameter of the body portions of the articles.

Broadly considered, the invention involves the initial formation of the neck or neck finish of an article by "injection molding" and the subsequent formation of the body portion of the article by "extrusion" and shaping of additional material, for example, by blowing.

The term "injection molding," or variations of such term, means the introduction under pressure of organic material, made plastic by heat or heat and pressure, into a mold cavity closed except where the material enters and which cavity, therefore, exactly determines the size and shape of the portion of the article formed therein. The term "extruding" or "extrusion" or variations thereof, means the feeding of such material under pressure and in plastic or working condition while only partly confined or unconfined by molding surfaces.

The invention may more clearly be understood from the following detailed description of the embodiments of the invention illustrated in the accompanying drawings, in which drawings:

Figures 1 to 6, inclusive, are views in central vertical section of apparatus for carrying out the method depicted in several steps in said figures;

Figs. 7 to 11, inclusive, are similar views illustrating modifications of the apparatus and method shown in Figs. 1 to 6; and Figs. 12 to 17 inclusive are views in vertical sectional elevations illustrating, further modifications of the method and apparatus of Figs. 1 to 6.

Referring to Figs. 1 to 6, the apparatus shown comprises an extruding device or nozzle indicated generally at 12 and an inverted mold unit 13 adapted to cooperate therewith.

The extruding device or nozzle 12 is associated with suitable apparatus (not shown) for supplying organic plastic material in plastic or working condition. Such apparatus does not constitute part of this invention and is omitted to simplify the illustration and description of the invention. Said device comprises an outer, double-walled sleeve 14 in which a space or chamber 15 is formed for receiving a temperature-controlling medium. Within sleeve 14 is the hollow plunger 16 which is spaced from the sleeve to provide a tubular passage for plastic material, as indicated at 17. Plunger 16 contains chamber 18 for receiving a temperature controlling medium through a pipe 19 in said chamber. The head 21 of plunger 16 is in the form of a valve or cut-off which is adapted to engage a seat 22 in the bottom of sleeve 15.

The mold unit 13 is divided horizontally into three sections, section 13a being the neck (and shoulder) mold, 13b the body mold and section 13c the bottom mold. Each of said sections preferably is divided vertically into sections mounted on hinge pins (not shcwn) for opening and closing operations.

Section 13a has the neck finish portion 23 which is surrounded by passages 23a, and shoulder portion 24 surrounded by passages 24a, the passages receiving temperature controlling fluid. The neck portion 23 receives neck pin 25, collar 26 of which fits tightly against mold section 13a. Neck pin 25 also has a central blowing air passage 27.

The bottom of sleeve 14 is tapered at 14a to seat tightly on the bottom of mold portion 24 and head 21 of plunger 16 is flat and seats on neck pin 25 to close the passage 27 therein.

The body mold section 13b is recessed at 28 to receive the section 13a therein and has a boss 29 which is fitted into the bottom mold section 13c. Sections 13b and 13c have passages 31 and 32 for the circulation of temperature-controlling medium therethrough.

Section 13c has opening 33 therein to provide a sliding fit with sleeve 14. The outside diameter of extruding device 12 is made small to reduce the diameter of opening 33. The internal diameter of sleeve 14 is proportioned to the diameter of the neck finish portion 23, being of substantially equal diameter at its tip as indicated at 34 and somewhat less diameter above its tip.

In performing my novel method with the above described apparatus, the parts are assembled as illustrated in Fig. 1, and plastic material is introduced under heat and pressure into the extruding device 12, as indicated at 17. Circulation of temperature controlling medium through chamber 15 of sleeve 14 and through plunger 16 maintains the material in plastic working condition. Such material now is injected into the neck finish mold portion at 23 around neck pin 25 to form the neck finish portion 35 of the article being made. Cooling medium preferably is circulated through passage 23a at this time to set and complete the formation of the neck finish at least sufficiently to prevent it from sticking to neck pin 25 which is now lowered into the position shown in Fig. 2.

It will be observed that the engagement of neck pin 25 and the head 21 of plunger 26 prevents formation of a fin across the interior of the neck finish.

Operations are now performed to develop the shoulders and body of the article. Beginning with the parts in the positions of Fig. 3, relative bodily axial movement of the extruding device 12 and mold unit is effected to withdraw the device from the unit. During such withdrawal device 12 is maintained in axial alignment with mold unit 13 by mold bottom 13c and by supports (not shown) for the device and mold unit. During this operation, additional material may be extruded from the device 12 and air may be admitted through passage 27 of neck pin 25 to expand the plastic material into contact with the shoulder mold portion 24 and the body mold portion 13b (see Fig. 3) as the material is being extruded from the extruding device 12. There is thus formed shoulder portion 36 and body portion 37. The extruding, blowing and withdrawal of device 12 are continued until the body portion 37 is completed.

Finally, the outer annular portion 38a of the bottom of the article is formed against bottom mold 13c. To accomplish this, the speed of withdrawal of the device 12 may be reduced or withdrawal stopped, so that blowing and stretching of the extruded material will reduce its thickness.

To complete the formation of the bottom of the article, the bottom mold 13c may be withdrawn and the tubular connection between the portion 38a and the material in device 12 necked-in by a constricting means, closed and severed. As illustrated in Fig. 4, this may be accomplished by employing a pair of V-notched shears 39 which may be closed as the device 12 and mold 13 relatively move into the positions shown. This results in the formation of an outwardly extending, roughly conical, bottom portion 38b and a closed end 17a on the tubular material 17 in device 12. During this part of the operation, the flow of air through neck pin 25 may be interrupted.

Portion 38b may be pushed inwardly of the plane of the bottom of the article and bottom mold 13c replaced, as shown in Fig. 5, in preparation for a blowing operation. End portion 17a may now be cut off by closing seating plunger 16, as also shown in Fig. 5. The portion 17a may be discarded as scrap.

To complete the formation of the bottom of the article, the conical portion 38b may, if necessary or desirable, be reheated by a burner or other heater (not shown) and either opening 33 in bottom mold 13c closed by a plug or disk (not shown) or the bottom mold 13c replaced by a mold bottom 13d, as shown in Fig. 6. Bottom mold 13d may be chambered, as shown at 32b, to receive a temperature-controlling medium. Air may now be admitted through passage 27 in neck pin 25 to blow out portion 38b and thus complete the bottom of the article, as indicated at 38 in Fig. 6.

During the operation of extruding and expanding, the mold portions 13, 13b, 13c and 13d preferably are cooled sufficiently to set the plastic material as it attains the shape of the molding surfaces. However, the cooling of mold bottom 13c should be moderate in order not to cool portion 38b to such an extent as to make too difficult the reheating and blowing out of this portion.

In the development of the article, the proper or desired time relation between extruding, withdrawing and blowing is maintained by suitable timing means (not shown) to secure the desired distribution of material in the shoulder, body and bottom portions of the article. Each of such operations may be continuous or periodic and may be simultaneous or timed to occur at different times during the formation of an article. By cooling the material as it is expanded into engagement with the mold wall, stretching or drawing of material thereabove may be effected by withdrawal of device 12 to assist in obtaining the desired wall thickness.

Wall distribution also may be controlled by varying the amount of material extruded as by movement of plunger 16 relative to sleeve 14 to move valve head 21 toward or away from the seat 22. Suitable mechanism (not shown) also may be provided for this purpose.

Instead of blowing out the material as it is being extruded, as illustrated in Fig. 3, blowing may be delayed until the nozzle 12 is in raised position. In this way, a tube may be formed of substantial length by extrusion which will be held in axial position between the nozzle and neck mold. After the desired length of tube thus is formed out of contact with the mold surfaces, it may be blown out by air. However, the blowing operation has to be performed before the nozzle 12 is disengaged from the opening in bottom mold 32.

In the modification illustrated in Figs. 7 to 11 inclusive, the neck finish and shoulder portions are formed by injection molding, body portion of the article is formed by extrusion without substantial expansion, and the bottom is formed by inserting a disk in the open end of the article and sealing it therein.

In these figures, the extruding device is indicated generally at 41 and the mold unit at 42. The device 41 comprises a hollow plunger 43 having a central tube 44 which forms a chamber 45 for temperature controlling medium. Surrounding the narrower upper portion of plunger 43 is a sleeve 46 which is spaced from the plunger to provide for the passage of plastic material 47 in tubular form. The bottom end 46a of sleeve 46 is adapted to act as a cut-off for the material in conjunction with a shoulder 48 formed on the plunger where the plunger is of slightly increased diameter. The lower end of plunger 43 is rounded, as shown at 49, to form the interior of the shoulder portion of an article, as hereinafter explained.

The device 41 which comprises the plunger and sleeve is mounted for reciprocation in a casing 51 containing a chamber 52 for temperature-controlling medium. The bottom of casing 51 is recessed at 53 to receive the boss 54 formed on the mold unit 42 to align axially the mold unit and extruding device.

The mold unit 42 is divided only vertically in this case and is chambered at 50 to receive a temperature-controlling medium. The inner wall of the mold has the neck finish portion 42a, shoulder portion 42b and body portion 42c which terminates at its upper end in a recess or groove of V-shape in cross-section, as indicated at 42d.

A neck pin 55 cooperates with the neck mold portion 42a to form the neck of an article. This neck pin 55 has a collar 56 therein which engages the bottom of mold unit 42 and its inner end is made flat to form a tight fit against the bottom of plunger 43, as indicated at 57, Fig. 7. Neck pin 55 also is chambered, as shown at 58, to receive a temperature-controlling medium.

In performing my novel method with the apparatus just described the mold unit 42 is engaged with the casing 52, as shown, and neck pin 55 is seated as shown in Fig. 7. The extruding device 41 is now moved downwardly into the mold unit until plunger 43 engages neck pin 42 and sleeve 46 is moved upwardly to permit plastic material to be injected under heat and pressure into the mold around the rounded end 49 of plunger 43 and into the neck mold portion 42a of the mold unit. This forms the neck or finish 59 and shoulder 60 of an article by injection molding.

The extruding device 41 is now raised while the extrusion of plastic material is continued, to form the body portion 61 of the article. See Fig. 8. During this operation, air may be admitted to the mold through tube 44 of plunger 43 to slightly expand the tubular material 47 to form body portion 61 and to insure that the shoulder 60 and portion 61 will be held in place against the mold wall. As the device 41 is moved out of the mold, sleeve 46 is moved down at the proper time to cut off the material in the mold from the material 47 in the device. Air pressure in the mold blows the material into the groove 42d, thus forming flanges 62a—62b on the open end of the article which provide a groove 62 therein.

The mold unit 42 now is disengaged from casing 52, neck pin 55 withdrawn and the open-ended article withdrawn. To close the open end of the article a disk or bottom 63 is placed in groove 62 and sealed therein by heat and pressure. The sealing of the bottom may be accomplished by engagement with a plate 64, Fig. 10, having a chamber 68 therein to receive a heating medium. This serves to squeeze flanges 62a—62b together, as shown in Fig. 11, thus sealing the disk 63 in place and completing the bottom of the article. The disk 63 may be heated to render it plastic before its insertion and this preheating may be confined to the edge of the disk.

It will be understood that the temperature of the extruding device is controlled to maintain the material to be extruded in plastic working condition, while the mold temperature is regulated so as to cool the material sufficiently to prevent it from sticking to the plunger as the plunger is withdrawn and to set the material, although sticking is prevented to some extent by the pressure of air thereon. If the material is not set sufficiently during the formation of the article, it may be cooled to a lower temperature in the mold before removal therefrom.

The distribution of material in neck 59 and shoulder 60 is determined by the size and shape of the cavity formed between the corresponding molding surfaces of mold unit 42 and plunger 43. The maximum diameter of plunger 43 determines the maximum thickness of wall portion 61 above the shoulder and this thickness may be diminished by restricting the flow of material between the end 46a of sleeve 46 and shoulder 48 of plunger 43, as device 41 is withdrawn to stretch or draw out the wall portion during its formation.

Suitable mechanism may be provided for operating the various parts of the apparatus in the desired time relation.

In the modified form of the invention illustrated in Figs. 12 to 17, apparatus is provided which comprises a mold unit 70, an extruding nozzle or device 71 and a finishing blow mold 72.

Mold unit 70 comprises a neck mold 73 and a neck pin or plunger 74 which is centered in the neck mold cavity 75 by a ring or closure 76 which closes the neck mold cavity, as shown. Neck mold 73 preferably is made in halves for opening and closing and is chambered as shown at 73a to receive a temperature controlling medium. The device 71 is similarly chambered at 71a.

Neck pin or plunger 74 is made hollow and has a pointed tip 77 which constitutes a valve seating on the end of the plunger and having a stem 78, the collar 79 of which acts as a stop against a spider 80 in the end of the plunger.

Blow mold 72 also is made in sections and has chamber 72a for temperature controlling medium. The top of this mold is recessed at 81 to receive and center neck mold 73.

In making articles with the apparatus last described, plastic material is supplied under heat and pressure in a solid stream or rod. Initially, the mold unit 73 is moved into engagement with nozzle 71 and plastic material is injection molded in the neck mold cavity about neck pin 74 which forms an initial opening in the neck portion 82 of an article being produced. During this and ensuing operations, the neck pin may be rotated or oscillated continuously or intermittently. When the neck 82 is molded, it is moved downwardly axially of nozzle 71 and additional material is extruded, as shown at 83a, Fig. 13. Following this step, neck pin 74 may be forced upwardly through the neck mold 73 to lengthen the initial opening and carry it into the material 83 thereabove. This may result in the formation of an enlargement or bulge 83b, Fig. 14. The neck pin 74 may now be lowered slightly relative to the neck mold and the entire unit further lowered and air admitted into the neck pin which enters the initial opening and expands the extruded material to form a hollow blank, as shown at 83c. When the desired amount of material has been extruded, a knife 84 severs the blank from the supply, as shown in Fig. 15.

The blank may now be further developed by rotating, swinging and blowing, or merely by suspending the blank and expanding it under the influence of gravity to a blank form, such as shown at 83d, Fig. 16. This figure shows the suspension of the blank by the neck mold in the closed blow mold in which it may be blown to final form by admission of air through the neck pin. Thus there is formed an article having a narrow neck 82 and wide body portion 83, as shown in Fig. 17.

Suitable means (not shown) may be provided for operating the various parts in suitably timed relation and the temperature of the various parts may suitably be regulated. The neck mold preferably is cooled throughout the operation to set the neck portion 82. Blowing air preferably is heated to assist in keeping the material plastic. The blow mold 72 preferably is cooled. The nozzle 71 is always heated. The cooling effect of neck pin tip 77 is offset by the natural reheating of the material contacted by the tip and by the heated air applied to such material.

The development of the blank to the desired shape may be assisted by upward movement of the mold unit, which will thicken the blank, especially if additional material is extruded during such movement.

Variations or changes may be made in the details of construction and in the method without departing from the scope of the claims. Although the forms of the invention shown in Figs. 1 to 11 have been described with relation to the formation of articles in molds having the shape of the finished articles, it may also be used for making blanks or preshaped articles to be completed in other molds by blowing or other methods of enlarging or forming preshaped articles of plastic material, as illustarted for example in Figs. 12 to 17. Therefore, the word "article" as used in the claims is not limited to finished articles but also applies to partially formed or incomplete articles or blanks.

The term "body portion of an article" as used in the claims means either the body portion or both the body portion and shoulder portion as separately referred to above except where the shoulder and body portions are specifically and separately referred to in said claims.

The embodiments of the invention which have been illustrated and described herein are particularly adapted to the formation of hollow articles from organic materials of the thermoplastic type of which cellulose acetate is an example. The invention may be employed in working cellulose derivatives such as cellulose esters and cellulose ethers as well as natural or synthetic gums or resins of either the thermoplastic or thermosetting type or mixtures thereof.

The temperatures of the various parts of the apparatus will be controlled or maintained in accordance with the properties of the organic material being worked. Thus in working thermoplastics, the parts will be heated where necessary or desirable to make the material plastic or workable and cooled to cause the material to set or harden; in working thermosetting materials, the parts may be heated to make the material plastic and workable initially, cooled (or unheated) to maintain plasticity or a semi-cured condition for further working and heated to set or harden the material.

Having thus described my invention, what I claim is:

1. The method of forming hollow articles of organic plastic material which comprises first forming the neck of an article by injection molding of such material and then forming the body portion of said article by extruding and shaping additional material integral with the neck of said article.

2. The method of forming hollow articles of organic plastic material which comprises first forming the neck of an article by injection molding of such material and then forming the body portion of said article by extruding and expanding additional material integral with the neck of said article.

3. The method of forming hollow articles of organic plastic material which comprises feeding such material from an extruding device into the neck forming portion of a mold unit and injection molding such material therein to form the neck portion of an article, and subsequently extruding additional material from said device into a body forming portion of said mold unit and shaping it therein to form the body portion of said article integral with the neck thereof.

4. The method of forming hollow articles of organic plastic material which comprises engaging an extruding device and neck forming mold, feeding material through said device and injection molding the neck portion of an article in said mold, and forming the body portion of said article by axially disengaging said device and neck forming mold, extruding additional material through said device, and shaping said additional material into the body portion of said article integral with the neck thereof.

5. The method of forming hollow articles of organic plastic material which comprises feeding such material in tubular form through an extruding device and injection molding the neck of an article in a neck forming mold, axially separating said device and neck mold while extruding additional material in tubular form, and shaping such extruded material to form the body portion of said article integral with the neck thereof during such separation.

6. The method of forming hollow articles of organic plastic material which comprises feeding such material in tubular form through an extruding device and injection molding said material in a neck forming portion of a mold unit to form the neck of the article, withdrawing said device from said unit and extruding additional material therefrom in tubular form during such withdrawal and simultaneously admitting air to the interior of said material to shape it in contact with a body forming portion of said mold unit to form the body portion of the article integral with the neck thereof, and closing one end of such body portion to form the bottom of the hollow article.

7. The method of forming hollow articles of organic plastic material which comprises feeding such material in tubular form through an extruding device while holding said device in engagement with a neck forming portion of a mold unit and injection molding the neck of an article, withdrawing said device from said unit while extruding additional material and expanding such material into contact with a body mold portion of said unit to form the body portion of said article integral with the neck thereof, and into contact with a bottom forming portion of said unit to partially form the bottom of the article, closing the tubular material and severing the molded portion thereof from the supply to roughly form the central bottom portion of the article, and blowing the roughly formed bottom portion to final shape.

8. The method of forming hollow articles of organic plastic material which comprises injection molding the neck and shoulder portions of an article, and extrusion molding the body portion of said article integral with the neck and shoulder portions of said article.

9. The method of forming hollow articles of organic plastic material which comprises feeding such material from an extruding device into a neck mold and injection molding the neck of an article, axially separating the device and mold, extruding and expanding into hollow blank form additional material integral with the neck of said article to provide a hollow blank, and blowing the blank to final form.

10. The method of forming hollow articles of organic plastic material which comprises engaging a neck mold with an extrusion device, injection molding the neck finish of an article in said neck mold, axially separating said neck mold and device, extruding additional material in solid cross section for the body portion of said article integral with the neck finish thereof, expanding said additional material to hollow form to provide a blank, and blowing the blank to the final form of said article.

11. The method of forming hollow articles of organic plastic material which comprises first forming the neck of an article by injection molding of such material, then forming the body portion of said article by extruding and shaping additional material integral with the neck of said article, and closing one end of said body portion to form the bottom of the hollow article.

JOHN R. HOBSON.